J. D. Otstot,
Saw-Gummer,
Nº 9,368.   Patented Nov. 2, 1852.
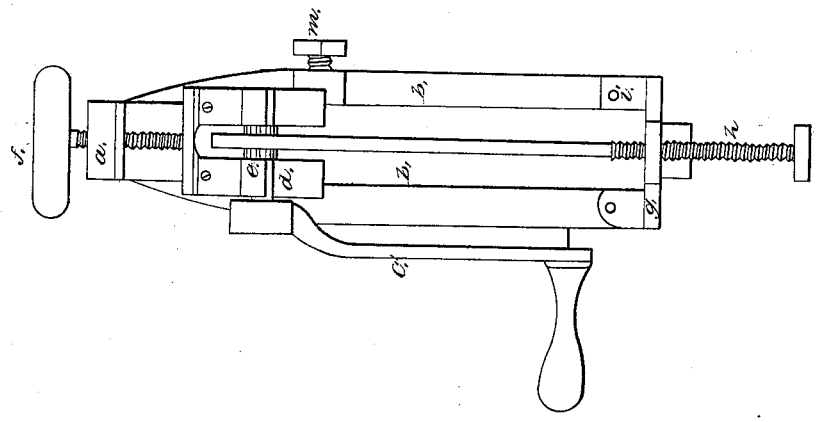
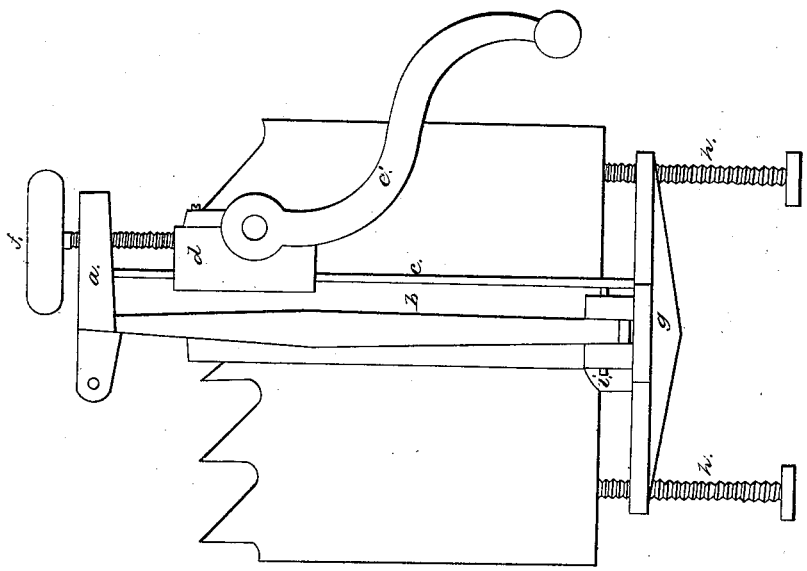

UNITED STATES PATENT OFFICE.

J. D. OTSTOT, OF SPRINGFIELD, OHIO.

SAW-GUMMER.

Specification of Letters Patent No. 9,368, dated November 2, 1852.

*To all whom it may concern:*

Be it known that I, J. D. OTSTOT, of Springfield, in the county of Clark and State of Ohio, have invented certain new and useful Improvements in Apparatus for Gumming Saws, and that the following is a full, clear, and exact description of the principle or character which distinguishes them from all other things before known, and of the usual manner of making, modifying, and using the same.

My apparatus for gumming saws is constructed to remedy a defect in other machines for the same purpose, namely, great facility in its application to a saw strained in a frame, and the permanency of its attachment in the line of its resistance to its action.

The construction is as follows: There is a solid casting composed of a head piece ($a$,) from which project downward two legs ($b$,) parallel to each other, with a space between them sufficient to admit the thickness of the saw, as clearly shown in the drawing. There is a flanch along the outer front edge of the legs, as at ($c$,) that serve as ways for a slide carriage ($d$,), which holds a bur cutter ($e$,) which is turned by a crank ($e'$,); the legs are further strengthened by ribs to resist lateral strain upon them; a portion of the head projects in front over the carriage, and screw ($f$,) passes down through it, and is connected with the carriage so that by turning said screw, the carriage with the cutter can be forced along the ways in either direction toward or from, the head; to the end of one of the legs is jointed a shoe piece ($g$,), projecting some distance before and behind the legs along the back of the saw (shown by red lines in the drawing); near each end of the shoe there is a set screw ($h$,); and when the apparatus is put upon the saw, and the shoe turned over, (the back thereof is shown in the drawing) the shoe is attached to the other foot by a pin ($i$,) put through them.

It is obvious that the apparatus can be set at any angle within a sufficient range by varying the distance the set screws pass through the shoe, they in all cases being made to press against the back of the saw; a set screw ($m$) is put through one of the legs near the head to hold the toothed edge of the saw firmly in place while being operated upon. To remove the set you have but to release this screw, and draw the pin ($i$,) from the shoe and turn it back, and the set screws in the shoe remaining in position, regulate the angle at which each tooth shall be cut, insuring uniformity in all the teeth.

Having thus fully described my improved apparatus for gumming saws, what I claim therein as new, and for which I desire to secure Letters Patent, is—

The combination of the frame ($a, b$,) shoe ($g$,) and set screw ($h$,) in the manner and for the purposes set forth.

J. D. OTSTOT.

Witnesses:
   JAS. M. BENSON,
   SAMUEL PARSONS.